Nov. 12, 1963     A. VANNE ETAL     3,110,797
ELECTRIC STEAM BATH HEATER
Filed April 23, 1962                                 4 Sheets-Sheet 1
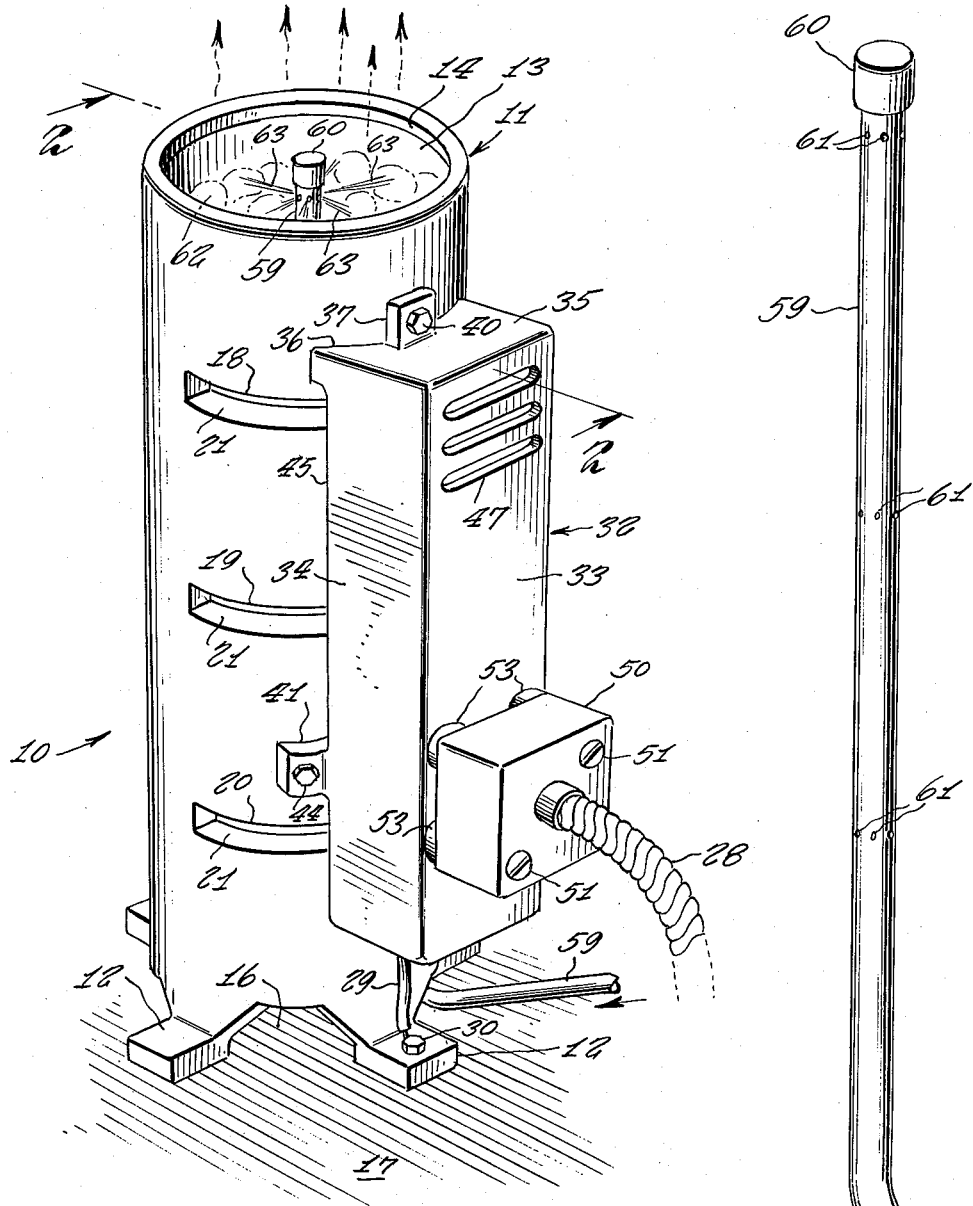
INVENTOR.
AHTI VANNE
JERRY POKORNY
QUENTIN L. SHIELDS
BY
ATTORNEY

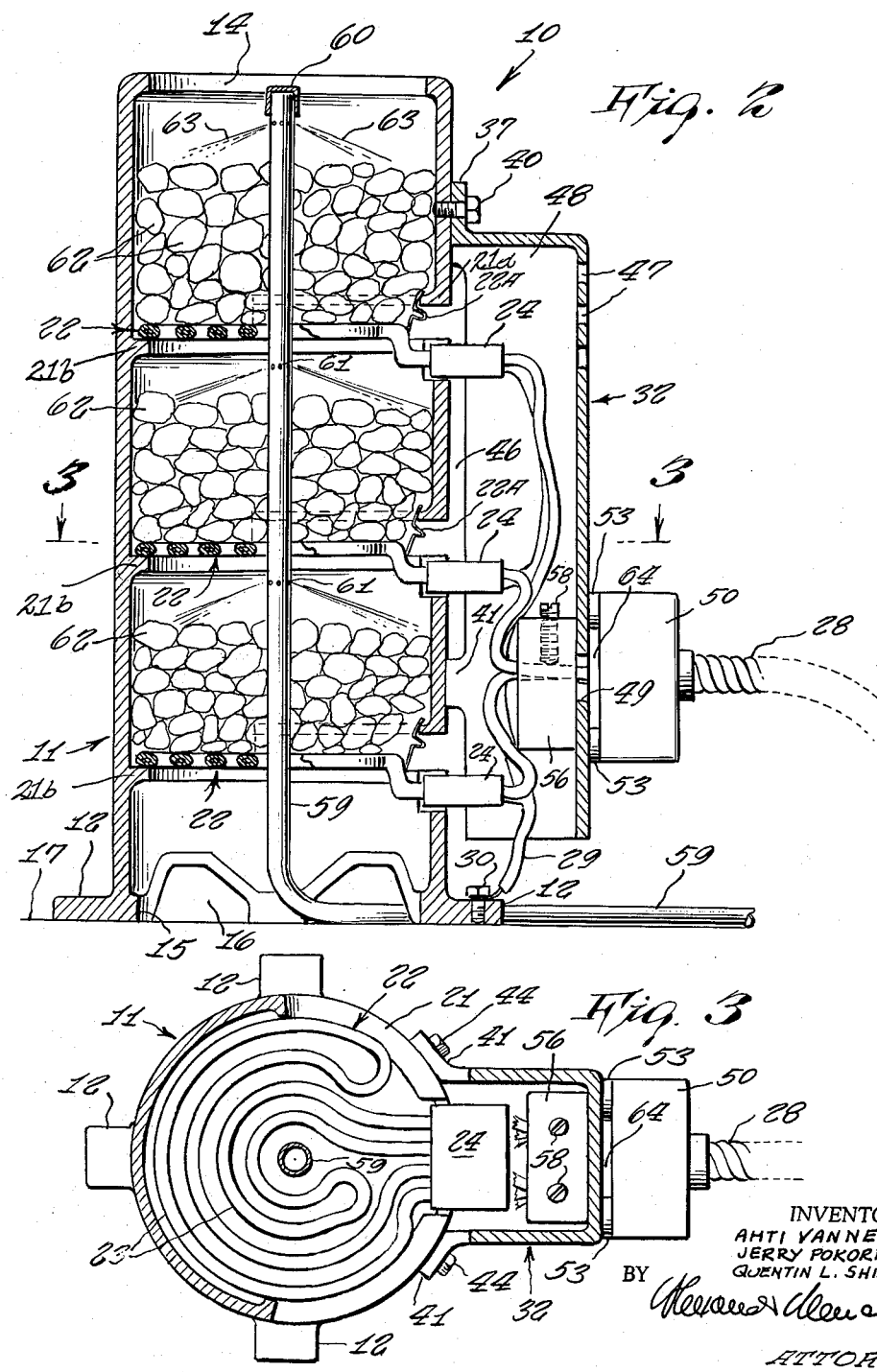

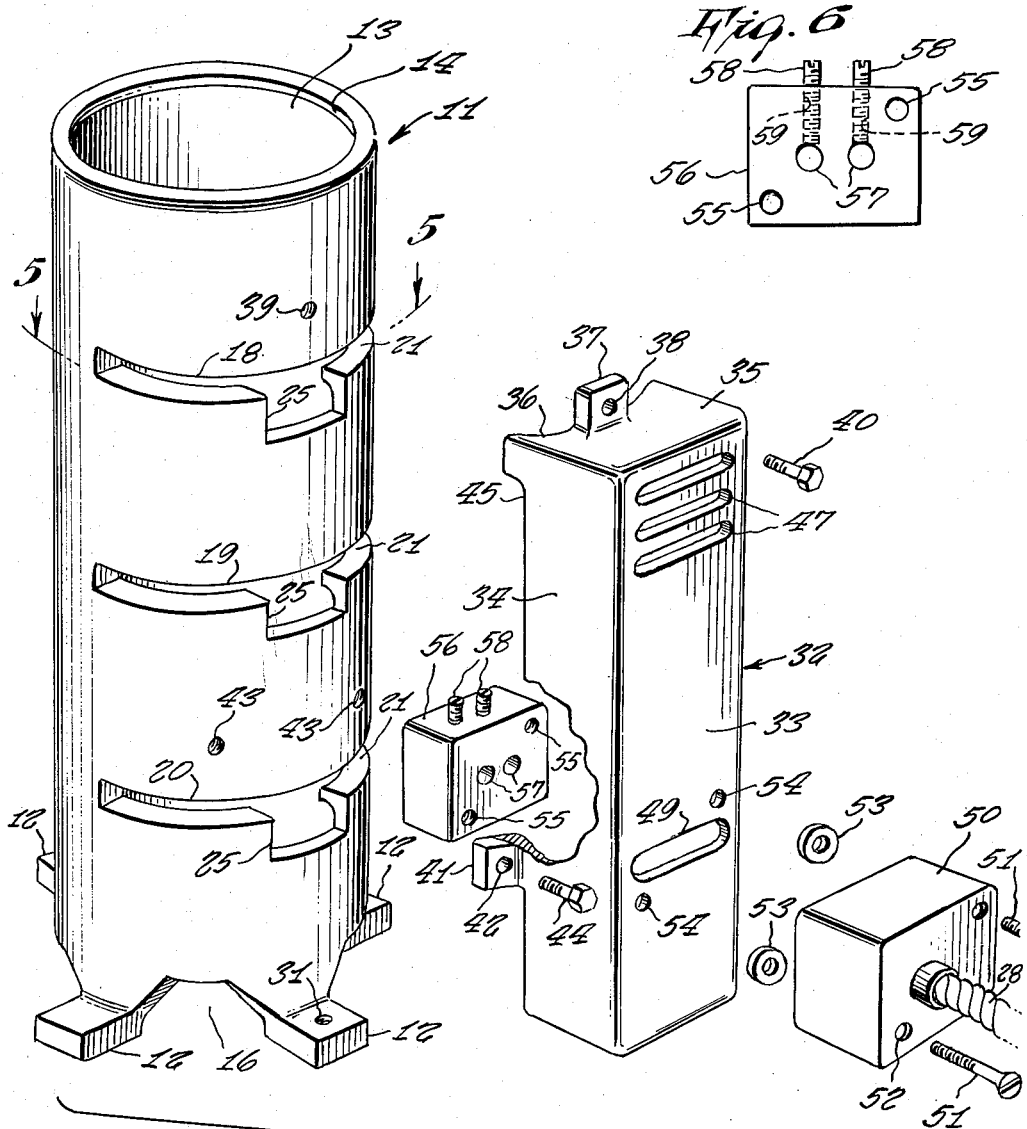
Fig. 6
Fig. 4
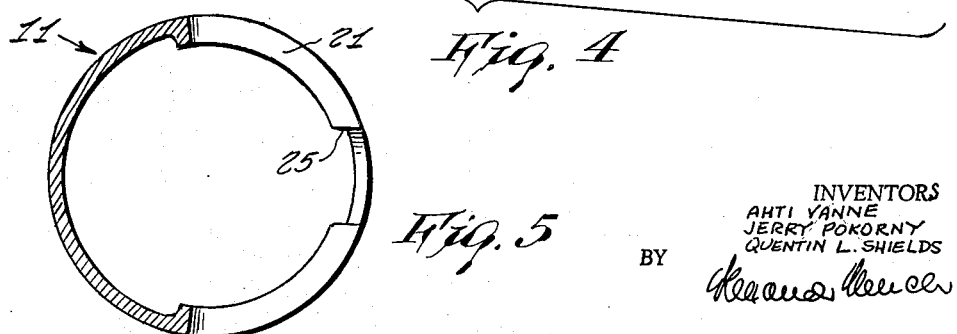
Fig. 5
INVENTORS
AHTI VANNE
JERRY POKORNY
QUENTIN L. SHIELDS
BY
ATTORNEY

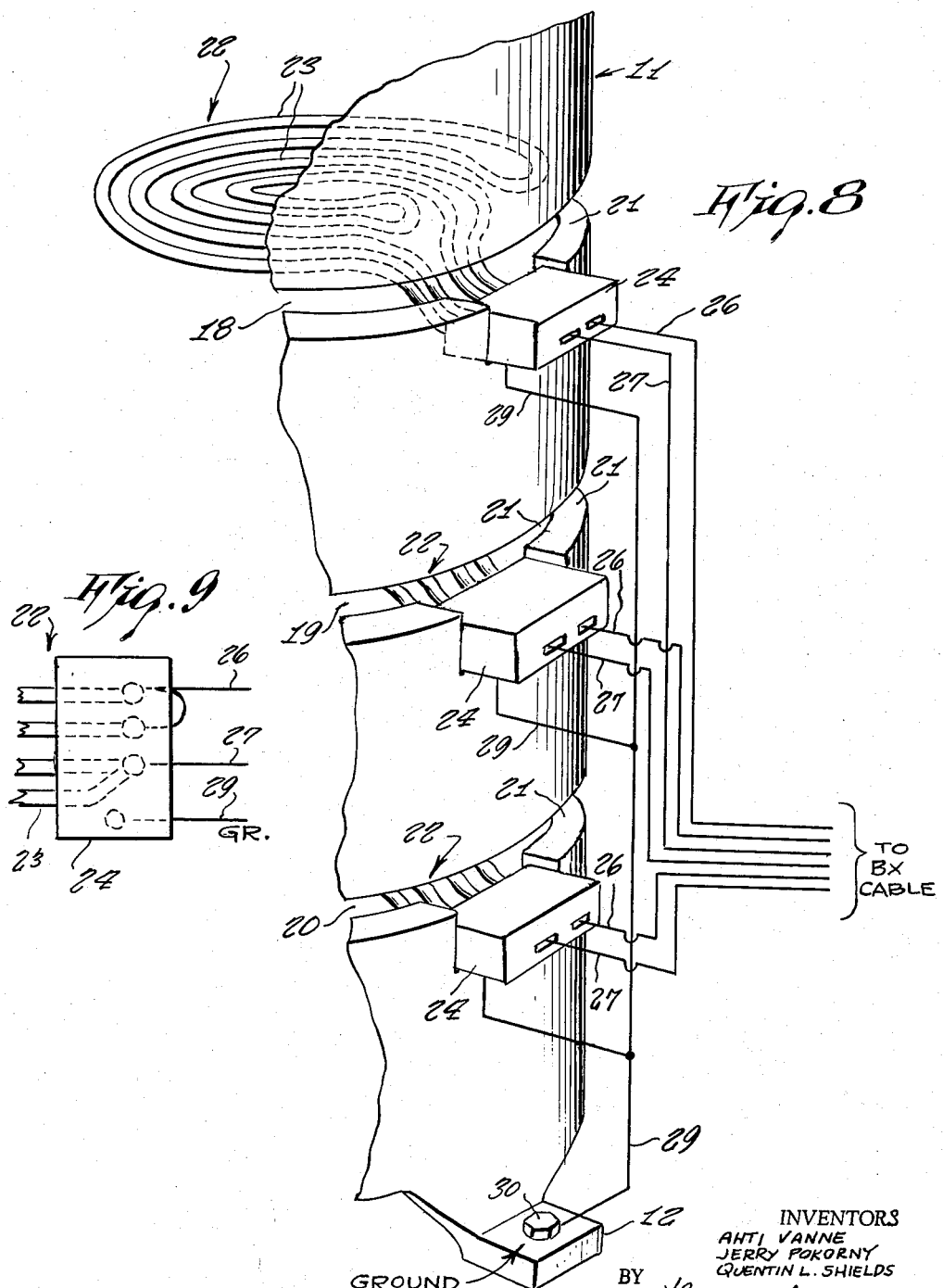

United States Patent Office 3,110,797
Patented Nov. 12, 1963

3,110,797
ELECTRIC STEAM BATH HEATER
Ahti Vanne, 16 Howe St., Huntington, N.Y.; Jerry Pokorny, 11 March Lane, Westbury, N.Y.; and Quentin L. Shields, 6 Endicott Lane, Commack, N.Y.
Filed Apr. 23, 1962, Ser. No. 189,495
4 Claims. (Cl. 219—38)

This invention relates generally to electrically heated steam baths for use in bathing, and more specifically to compact heater adapted to provide heat and steam for a limited enclosure.

An object of the invention is to provide a "Sauna" unit having electrical heating means for production of dry heat and means for controlled production of steam in combination within a compact and portable housing and intended to be disposed in a limited enclosure for service as a heated and steam room.

Heretofore, heaters or stoves used for such purposes have been of large dimension thereby interfering with bathing enclosures. The invention herein provides a compact, easily controllable, efficient and portable stove to afford a heated and steam room for bathing within a small enclosure and wherein the degree of heat and amount of steam is at the control of the bather.

Another object of the invention is to provide a heater of the above type which is of simple construction, has no movable parts, is safe in operation, easy to assemble and disassemble and is also durable.

These objects and other incidental objects and advantages of the invention will hereinafter appear in the progress of the disclosure and as pointed out in the appended claims.

Accompanying this specification are drawings showing a prepared form of the invention and wherein:

FIGURE 1 is a view in perspective showing an embodiment of the invention in operative use;

FIGURE 2 is a sectional view of FIG. 1 across the plane 2—2 thereof;

FIGURE 3 is a sectional view of FIG. 2 across the plane 3—3 thereof;

FIGURE 4 is an exploded view in perspective showing various mechanical elements for mounting and utilization in the assembly of the device;

FIGURE 5 is a sectional view of FIG. 4 across the plane 5—5 thereof;

FIGURE 6 is a front view in elevation of one of the parts illustrated in FIG. 4;

FIGURE 7 is a fragmentary perspective view of a water spray pipe forming a component part of the assembly of the invention;

FIGURE 8 is a fragmentary view in perspective and partly diagrammatic showing the electro-mechanical cooperative relationship forming part of the invention herein; and FIGURE 9 is a plan view of a part cooperating with the heater body shown in FIG. 8.

In accordance with the invention and the preferred form shown, numeral 10 indicates generally the heater or stove of the invention herein and comprises a main housing 11 in cylindrical form and supported in an up-ended position by means of a plurality of supports such as feet 12 disposed in outwardly extending radial direction. Housing 11 provides an internal chamber 13 communicating with the atmosphere by means of top and bottom openings 14 and 15 respectively. Between adjacent legs 12 and adjacent parts of main housing 11 are openings or cut-outs 16 which extend to the supporting surface 17 to allow air draft to be drawn into the lower part of the internal chamber 13.

Along cylindrical housing 11 are a plurality of horizontally extending slots vertically spaced and in alignment such as 18, 19 and 20 as shown in FIGS. 1, 4 and 5, said slots extending laterally approximately to the extent of one-half the circumference of housing 11.

The lower edge of each of the slots 18, 19 and 20 has an inwardly projecting flange 21 serving as a partial platform on which a conventional electrical heating element 22 is supported. It is to be noted that each slot 18, 19 and 20 is of sufficient length and width to permit introduction of an element therethrough from the outside, the element as shown being comprised of a circular arrangement of two extended Calrod (registered trademark) loops 23 whose ends connect to a terminal block 24.

Each of slots 18, 19 and 20 is further provided with a downwardly extending and communicating notch 25 to receive between the bottom and side walls thereof a terminal block 24 and which projects outwardly from the outer surface of housing 11. The heating element loops 23 are retained in proper positions by means of a clip 22a forming part of the heating element conventionally and which bears against the upper inwardly turned edge 21a of respective slots 18, 19 and 20, loops 23 resting on inner circumferential flanges 21b running continuous with flanges 21.

As best shown in FIGS. 8 and 9, electrical heating lead wires are connected to each of the terminals of blocks 24. The live wires 26 and 27 lead from each of the blocks communicate with a BX covered cable 28 conencted to an appropriate electrical power source. Another lead or ground wire 29 leads from each terminal block 24 and is connected at the end to main housing 11 such as at bolt 30 in opening 31 of one of the feet of legs 12, the lead serving as a ground for the entire unit.

Main housing 11 is preferably formed of cast iron for purposes of durability and to satisfy heating conditions therewithin, the same preferably having a porcelainized finish on the outer surface. It is further provided with a covering unit preferably formed of cast iron to protect electrical equipment leading therefrom. As shown in FIG. 4, cover member 32 preferably of cast iron and externally porcelainized is in the form of an elongated housing having a front wall 33, side walls 34 and a top wall 35. The rear edge 36 of top wall 35 has a curvature corresponding to the cylindrical contour of main housing 11 and has an upstanding lug 37 with an opening 38 therethrough for affixation to housing 11, the latter having an opening 39 for receiving an affixing bolt 40. Lug 37 cooperates with another lug 41 extending laterally at the lower edge of side wall 34, the lug 41 also having an opening 42 aligning with a threaded opening 43 in housing 11 for affixation thereto by bolt 44.

Each of sides 34 of the cover 32 has a longitudinal notch 45 at the edges and extending down to the ends to allow for air circulation through the formed spacing 46 as best shown in FIG. 2 between housing 11 and cover 32. In addition the bottom of cover 32 is open as shown in FIG. 2 and terminates above legs 12. Cover 32 on the front wall adjacent the top is provided with a series of louvers 47 to allow for air circulation through the cover interior chamber 48.

Another opening 49 is provided on front wall 33 above the lower edge thereof for introduction of wire leads 26 and 27, and surrounding said opening 49 is an electrical connection box such as 50 attached to cover front wall 33 such as by screws 51 adapted to pass through openings 52 in cover wall 33, then through spacers 53, then through openings 54 in cover wall 33 and then into threaded openings 55 in a block 56 disposed adjacent or against the inner side of cover front wall 33. Block 56 is formed of a non-combustible and non-conducting material and has a pair of openings 57 extending therethrough which align with the opening 49 in cover wall 33. Live wires 26 and 27 for each of the heating elements 23 pass through these openings 57 and are clamped therein by means of a vertical screw 58 engaging threaded openings 59 which communicate transversely with the openings 57. The spacers 53 preferably formed of asbestos afford additional air circulation between the connection box 50 and the heat generated within main housing 11 thereby protecting the BX cable leading from the connection box 50, space 64 being clearly shown in FIGS. 2 and 3.

To provide water for steam production, a water supply pipe 59 is provided entering the lower part of main housing 11 and extends upwardly through the center of each of the heating units 23. The pipe 29 is provided with a closed end such as by cap 60 affixed to the upper end. Openings 61 are provided at spaced positions along pipe circumference as shown in FIG. 2. Pipe 59 and cap 60 are formed preferably of stainless steel welded while each of the needle openings 61 is of relatively small diameter in actual practice, an opening of about .020 inch in diameter being suitable for purposes intended. Each of the needle openings 61 is disposed at an angle of approximately 10° below the horizontal whereby discharge will be at a slightly downward angle. Positioning of openings 61 and the angle specified are presented only as a preference and not for purposes of limitation.

Each of the heating elements 23 on the various tiers serves as a support for a load of broken stones 62 which are piled to a height slightly below the level of each set of needle openings 61 along the center pipe. Thus, in operation a remote electrical switch (not shown in drawings) is closed for supplying electrical current to the several heating elements 23. These elements gradually heat up stones 62 which are then sprayed by operating a valve control (not shown) the sprays being indicated by numeral 63 in FIG. 2.

The device can be in continuous operation or otherwise controlled, the stones holding the heat and the water sprayed thereon being vaporized and carried out from the top of the device into the heated air.

The heater or stove above described for mounting within a small enclosure for steam bathing not only has advantages in size but also includes other advantages such as in ratio of heating area by utilizing shape of housing, in provision of tiers for mounting of heating elements in the manner of introduction and mounting of said heating elements, in the manner of feeding a spray directed to the heated stones in each tier, in the air-circulatory provisions, and in simplicity of construction and assemblage.

It is understood that minor changes and variations in the size, material, shape and integration of parts may all be resorted to without departing from the spirit of the invention and the scope of the appended claims.

We claim:

1. A combined heating and steam unit comprising an elongated main metallic housing body having an open top and bottom, supporting legs therefor, a plurality of vertically spaced and parallel supporting flanges along the interior of the main housing body, an electrical heating unit supported on each of said supporting flanges, the main housing body having vertically spaced and parallel notches each opposite each of said supporting flanges for introducing and removing said heating units, a vertically extending and central water pipe within the housing and having spray outlets above each of said heating units, heat receiving and retaining elements supported on each heating unit whereby water sprays on said elements are convertible to steam and escapable through the main housing.

2. In a combined heating and steam unit, the combination of a vertically disposed elongated hollow and metallic cylindrical housing, a support therefor, a plurality of vertically spaced supporting flanges along the inner face of said housing and along the inner circumference to form tier levels, an electrical heating unit supported on each of said supporting flanges to provide heating means for said levels, the housing having vertically spaced notches each opposite each of said supporting flanges for introducing and removing each of said heating units, each of said heating units being provided with heat receiving and retaining elements supported thereon, and a vertically extending and central water pipe within the housing and having spray outlets above each of said heating units whereby water sprays on said heat receiving and retaining elements are convertible to steam and escapable through the main housing.

3. In a combined heating and steam unit as set forth in claim 1 wherein each of said notches is providing with a lower communicating notch, an electrical terminal block connected to each heating unit and mounted in each of said communicating notches.

4. In a combined heating and steam unit as set forth in claim 3 and provided with a covering housing for said connector blocks.

References Cited in the file of this patent

UNITED STATES PATENTS

| 1,829,765 | Spalding | Nov. 3, 1931 |
| 2,543,583 | Mattox | Feb. 27, 1951 |
| 2,563,345 | Limeric | Aug. 7, 1951 |
| 3,061,706 | Lundbom | Oct. 30, 1962 |

FOREIGN PATENTS

| 884,956 | Great Britain | Dec. 20, 1961 |